Sept. 18, 1934. W. P. OSGOOD Re. 19,319

SEAM PRESSING MACHINE

Original Filed Dec. 30, 1927

Inventor.
Walter P. Osgood
by Heard Smith & Tennant.
Attys

Reissued Sept. 18, 1934

Re. 19,319

UNITED STATES PATENT OFFICE 19,319

SEAM PRESSING MACHINE

Walter P. Osgood, Malden, Mass., assignor to Boston Machine Works Company, Lynn, Mass., a corporation of Massachusetts Original No. 1,691,493, dated November 13, 1928, Serial No. 243,733, December 30, 1927. Application for reissue August 2, 1930, Serial No. 472,709

15 Claims. (Cl. 12—51)

This invention relates to a method of forming back-seams for footwear and to a combined taping and seam-pressing machine of the type shown in my Patent No. 1,646,212, October 18, 1927. The device illustrated in said patent comprises a work support over which is fed work in the form of two pieces seamed together by a seam presenting a seam ridge on one face of the work and a seam crease on the other, means to lay an adhesive tape over the seam ridge, and a seam-pressing member cooperating with the work support to press the seam ridge and simultaneously to press adhesive tape against the flattened seam ridge.

The seam-pressing member in said patent is so constructed that as the work and the tape pass to the pressing member the latter will act first on the seam ridge to press or flatten the latter and simultaneously cause the adhesive tape to adhere thereto and will then act on the marginal portions of the tape either side of the seam ridge and cause such marginal portions to adhere to the work outside of the flattened ridge. This method of operation is secured by providing the active face of the pressing member with a groove at its heel or rear end which groove is of a size to receive the flattened and taped seam ridge so that as the work progresses beneath the pressing member the forward or entering end of the pressing member will press the seam ridge through the interposed tape but will not engage the work either side of the seam ridge while at the rearward or delivery end the seam ridge will occupy the groove and the active face of the presser member either side of the groove will engage the marginal portions of the tape and press them against the work outside of the pressed seam ridge.

The combined taping and seam pressing machine disclosed in my patent hereinbefore referred to is particularly useful in taping and pressing the back seams which unite the shoe-quarters of a shoe. When incorporated in a shoe the outer face of the connected quarters is the grain side of the leather. In order to prepare the back seam for the operation of the combined taping and seam pressing machine hereinbefore referred to, the two shoe quarters were stitched together at one end on a curved line, flesh side out. Stated in another way the shoe quarters were stitched together while turned inside out. Then the quarters were opened, but not enough to turn them right side out. When opened the quarters presented a seam ridge on the flesh side of the work and a seam crease on the grain side of the work. The quarters, inside out, were then inserted into the combined taping and seam pressing machine which simultaneously taped the seam ridge and pressed it to reduce its abruptness. Thereafter the quarters were turned right side out to locate the taped and pressed seam ridge on the concave side and the seam crease on the convex side of the work. As the tape had been applied to a convex surface originally concaving said surface tended to wrinkle the tape and bulge the seam crease.

An object of my present invention is to provide an improved form of work support and presser by which a seam ridge presented by a concave surface may be taped and pressed. In the present embodiment the work support is provided with a groove into which the seam ridge may be depressed, and the presser is provided with two portions, one of which is relatively narrow and is arranged to press or flatten the seam ridge and depress it into the groove and at the same time to cause the adhesive tape to adhere to the seam ridge, and the other one of which is relatively wide and is arranged to act on the portions of the tape on both sides of the seam ridge and press the latter against the work. These two portions of the presser have such a relative position that as the work is fed over the work support the relatively narrow portion of the presser acts on the work in advance of the relatively wide portion. Hence at any point along the seam the seam ridge will be pressed and the tape applied thereto before the portions of the tape on the sides of the seam are attached to the work. Depressing the seam ridge into the groove causes its bottom to smooth the seam crease and its sides to impart a concavo-convex formation to the work, the concave side presenting the seam ridge and the convex side presenting the seam crease.

To the accomplishment of these objects, and such others as may appear hereinafter, the various features of the invention relate to certain methods, combination and arrangements of parts hereinafter described and then set forth broadly and in detail in the appended claims which possess advantages readily apparent to those skilled in the art.

The various features of the present invention will be readily understood from an inspection of the accompanying drawing illustrating the best form of the invention and the preferred modes of practicing the invention at present known to the inventor, in which, Figure 1 is a fragmentary view of a combined seam-pressing and tape-applying means embodying my invention;

Inasmuch as the present invention, in so far as the machine is concerned, relates simply to the work support and the presser I have not thought it necessary to illustrate herein a complete machine, but have shown only the parts thereof with which the invention is concerned.

Figure 1:
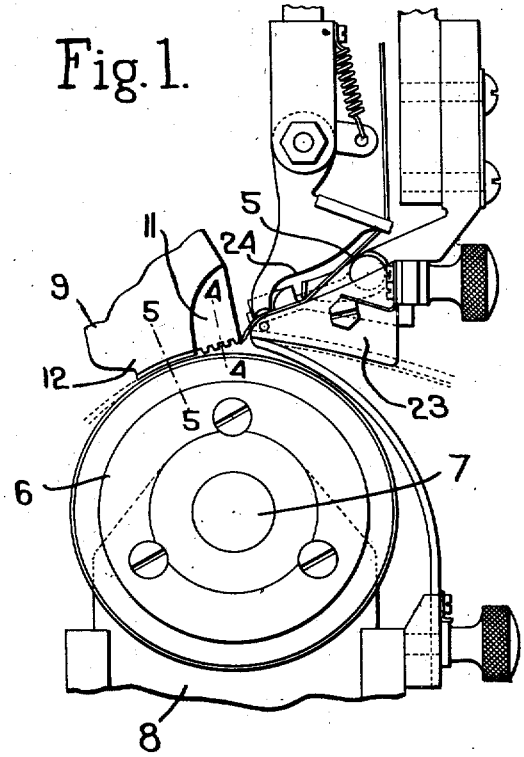
Figure 3:
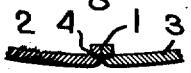
Fig. 3 illustrates the same pieces after they are opened out to present the seam ridge.
Figure 2:
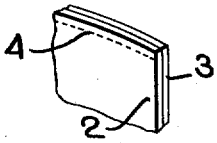
Fig. 2 is a fragmetary view showing two pieces seamed together.

The machine to which this invention is applied is designed to press a seam ridge 1 (Fig. 3) which is formed when two pieces 2 and 3 of leather or other sheet material are seamed together by stitches 4 adjacent the edges of the pieces and said pieces are afterwards turned right side out as shown in Fig. 3 and is also designed to apply an adhesive tape 5 to the pressed seam simultaneously with the pressing of the latter. As shown in Fig. 3 when the quarters are turned right side out a seam ridge is presented on the concave face and a seam crease on the convex face of the work.

The pressing of the seam and applying the tape is accomplished through the cooperation of a work support and seam presser all as shown in my above-mentioned Patent No. 1,646,212 and also in my prior Patent No. 1,549,376, dated August 11, 1925. The work support is shown at 6 and it is in the form of a roll which is freely mounted on a shaft or stud 7 carried in a stand or support 8.

The presser is indicated at 9 and it has a combined oscillating and rocking motion, all as described in said patents which causes it to intermittently engage the work and feed it forward.

The work support 6 is formed with a peripheral groove 10 into which the taped and flattened seam ridge may be depressed.

In the construction illustrated the groove 10 is provided with a solid bottom and with yielding sides. This is provided for by forming the roll 6 with a metal ring 41 which forms the bottom of the groove and by incorporating in the roll two rings 42 of yielding material, such as rubber, which form both sides of the groove and the portion of the work supporting face either side of the groove.

As stated above the presser 9 is provided with two portions one of which is relatively narrow and the other of which is considerably wider. The relatively narrow portion of the presser is that which acts on and presses the seam ridge and also causes the tape to adhere to the flattened or pressed seam ridge while the wider portion of the presser is that which acts on the tape on both sides of the seam ridge and completes the application of the tape to the work. These two portions of the presser may be integral with each other or may be separate elements movable relative to each other, but in the preferred embodiment of the invention the narrow portion, whether integral with the wide portion or separate therefrom, presses the seam ridge as the work is advanced across the work support, applies the tape to the ridge and depresses the taped and flattened ridge into the groove, the wider portion of the presser then acting on the work and pressing the tape thereagainst on both sides of the flattened seam. In the particular embodiment of the invention herein illustrated the two portions of the presser element are integral with each other both being formed as part of the presser element 9. The forward or relatively narrow portion is indicated at 11 and the wider portion which is at the rear of the presser is indicated at 12.

In the drawing 23 indicates a resilient seam crease guide such as shown in my Patent No. 1,850,120, March 22, 1932 which cooperates with the seam crease to guide the work to the work support and 24 indicates a tape delivery means by which the adhesive tape 5 is delivered to the seam ridge just before the latter passes under the pressing element 9.

Figure 4:
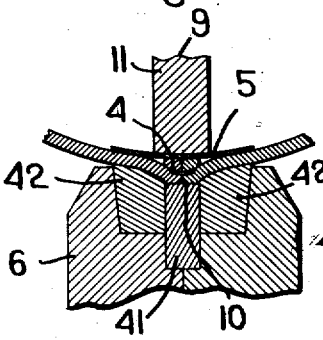
Fig. 4 is a view in enlarged elevation on the line 4—4, Fig. 1.

In the operation of the device, as the work in the form shown in Fig. 3 is fed to the work support the tape will be laid over the seam ridge all as described in the above-mentioned patents. As the work with the tape thereon passes under the presser 9 the narrow forward portion 11 thereof acts on the seam ridge as shown in Fig. 4 and presses the latter, this pressing operation being done through the tape 5 which has been laid over the seam ridge. Since this portion 11 is relatively narrow the full pressure thereof will be applied to the seam ridge zone of the work and said ridge will be pressed or flattened to the desired extent. During this operation the seam ridge is forced into the groove 10 as seen in Fig. 4 and the adhesive tape 5 is pressed against and caused to adhere to the flattened seam ridge. When the work passes from under the narrow portion 11 of the presser to a position under the wider rear portion 12 the marginal portions 13 of said wider end 12 will engage the tape on either side of the depressed seam ridge and will press such portions of the tape against the work, thus completing the application of the tape to the work.

During the pressing of the seam ridge by the narrow portion 11 of the presser the seam crease will be forced against the metal ring 41 which is unyielding and will be crowded into the groove 10, the sides of which are somewhat yielding, and during this operation the work either side of the flattened seam ridge is supported by the yielding rings 42. When the work passes underneath the wider part 12 of the presser the portions 13 of the face thereof act on the portions 14 of the tape either side of the pressed seam and coact with the yielding rings 42 to complete the pressing of the tape against the work as shown in Fig. 5.

The groove 10 is of sufficient depth so that as the depressed seam ridge passes beneath the portion 12 of the presser there will be relatively little pressure, if any, on the flattened seam ridge and the pressing force of the presser will come on the marginal portions 14 of the tape and on the portions of the work therebeneath which are supported by the yielding rings 42 of the work support 6. With this arrangement, therefore, the seam will be progressively pressed and the tape will also be progressively acted on both longitudinally and transversely thereof.

Figure 5:
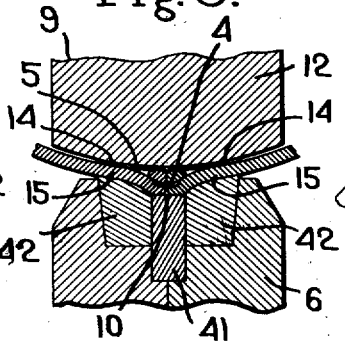
Fig. 5 is a view in enlarged sectional elevation on the line 5—5, Fig. 1.
Figure 6:
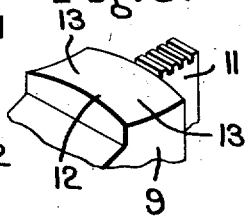
Fig. 6 is a detail view in perspective of the active face of the presser.
Figure 7:
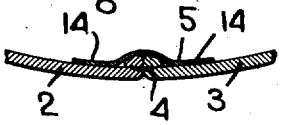
Fig. 7 is a detail view in sectional elevation showing the pressed seam with the tape applied thereto.
Figure 8:
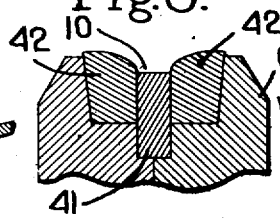
Fig. 8 is a detail view in sectional elevation of the work support.

The forcing of the work into the groove 10 during the pressing of the seam ridge as shown in Fig. 5 gives the face of the work which is opposite the seam ridge, and which is usually the outer face of the work when the latter is incorporated in a finished article, a convex shape as will be readily seen from Figs. 4 and 5, while the face of the work on which the tape 5 is laid is given a concave curvature. When, therefore, the work comes out of the machine the tape will tend to hold the work in the general shape shown in Fig. 7. This is advantageous in some kinds of work, especially in treating the pieces of leather which are sewed together to form the heel portion of a shoe since when these pieces are incorporated in the shoe the outer face of the work which is opposite the seam ridge is on the outside of the heel and will naturally have a convex curvature.

Crowding the seam crease against the ring 41, forming the bottom of the groove 10, causes the ring 41 to smooth the seam crease and remove any tendency it may have to bulge.

It will be clear to those skilled in this art, and with the general objects of the present invention in view, that changes may be made in the steps of the method and in the details of structure, the described and illustrated embodiments thereof being intended as exploitations of the underlying essentials of the invention, the features whereof are definitely stated in their true scope in the claims herewith.

What is claimed as new, is:

1. A shoe machine comprising a back heel seam supporting member, a guide member for maintaining said seam in the proper position, a feeding member, a smoothing member for engaging the outside of said seam, and means for applying a strip of material over the inside of the seam.

2. A shoe machine comprising a back heel seam supporting member, a smoothing member for engaging the outside of said seam, and means for applying a strip of material over the inside of the seam.

3. In a seam pressing machine the combination with means for supporting work having a concavo-convex formation comprising the pieces to form the heel portion of a shoe seamed together by a seam presenting a seam ridge on the concave face of the work and a seam crease on the convex face of the work, and means for applying a tape to the seam ridge, of means for smoothing the convex face of the work adjacent the seam crease.

4. In a seam pressing machine the combination with means for supporting the pieces to form the heel portion of a shoe seamed together by a seam presenting a seam ridge and means for applying a tape to the ridge, of means for imparting a convex curvature to the face of the work opposite the face upon which the tape is laid.

5. In a seam-pressing machine the combination with means for supporting the pieces to form the heel portion of a shoe seamed together by a seam presenting a seam ridge on one face of the work and a seam crease on the other, and means for applying a tape to the ridge, of means for imparting a convex curvature to the face of the work opposite the face upon which the tape is laid and for smoothing the seam crease.

6. In a seam-pressing and tape-applying machine the combination with a grooved work support over which is fed work in the form of two pieces seamed together by a seam presenting a seam ridge, of means cooperating with the work support to apply tape to the seam ridge and depress a portion of the work into engagement with the bottom of the groove.

7. In a seam-pressing and tape-applying machine the combination with a grooved work support over which is fed work in the form of two pieces seamed together by a seam presenting a seam ridge on one face of the work and a seam crease on the other, of means cooperating with the work support to apply tape to the seam ridge and depress it into the groove, the sides of said groove being shaped to impart a convex curvature to the seam crease face of the work.

8. In a seam-pressing and tape-applying machine the combination with a grooved work support over which is fed work in the form of two pieces seamed together by a seam presenting a seam ridge on one face of the work and a seam crease on the other, of means cooperating with the work support to apply tape to the seam ridge, press the taped ridge, and force the seam crease into engagement with the bottom of the groove.

9. In a seam-pressing and tape-applying machine the combination with a grooved work support over which is fed work in the form of two pieces seamed together by a seam presenting a seam ridge on one face of the work and a seam crease on the other, of means cooperating with the work support to apply tape to the seam ridge, press the taped ridge, and force the seam crease into engagement with the bottom of the groove, the sides of the groove being shaped to impart a convex curvature to the seam crease face of the work.

10. In a seam-pressing and tape-applying machine the combination with a grooved work support over which is fed work in the form of two pieces seamed together by a seam presenting a seam ridge, of means for laying an adhesive tape over the seam ridge as the work is fed to the machine and a presser cooperating with the work support to apply the tape thereto and press the taped ridge, said presser having a portion thereof, with which the seam ridge first contacts, relatively narrow so that it will engage the seam ridge and depress the taped seam ridge into the groove of the work support, the rear portion of said presser being wider than the bottom of said groove and so disposed relative to the relatively narrow portion and to the depressed seam ridge that as the work passes to said rear portion the latter will engage the portions of the tape outside the depressed seam and press said portions of the tape against the portions of the work supported by the work support upon either side of groove.

11. In a seam-pressing machine the combination with a grooved work support over which is fed two pieces seamed together by a seam presenting a seam ridge, of means to lay an adhesive tape over the seam ridge and means operating as the work is fed over the work support to apply pressure first to the seam ridge and the tape overlying it thereby to depress the seam ridge into the groove of the work support and thereafter to apply pressure to the marginal portions of the tape and the work which is supported either side of the groove in the work support.

12. In a seam-pressing machine the combination with means for supporting the pieces to form the heel portion of a shoe seamed together by a seam presenting a seam ridge, of means for applying tape to the ridge and pressing it, said means cooperating to impart a concave curvature to the face of the work on which the tape is laid.

13. In a seam-pressing and tape-applying machine, the combination with a work support over which is fed work in the form of two pieces seamed together by a seam presenting a seam ridge, said work support having a groove of a size to receive the seam ridge after it is pressed or flattened, of means for laying an adhesive tape over the seam ridge as the work is fed to the machine, and an intermittently acting presser cooperating with the work support to press the seam ridge and apply the tape thereto, said presser having the portion thereof with which the seam ridge first contacts relatively narrow so that it will engage the seam ridge and press the latter into the groove, the rear portion of said presser being wider than said groove and so disposed relative to the relatively narrow portion that as the work passes under said rear portion the latter will engage the portions of the tape outside the flattened seam and press said portions of the tape against the portions of the work supported either side of the groove.

14. In a seam-pressing machine, the combination with a work support over which is fed two pieces seamed together by a seam presenting a seam ridge, said work support having a groove of a size to receive the pressed seam ridge, of means to lay an adhesive tape over the seam ridge, and means operating as the work is fed over the work support to apply pressure first to the seam ridge and the tape overlying it thereby to press the seam and force it into the groove of the work support, and thereafter to apply pressure to the marginal portions of the tape and the work which is supported either side of the groove in the work support.

15. In a seam pressing machine, the combination with means for supporting work having a concavo-convex formation comprising the pieces to form the heel portion of a shoe seamed together by a seam presenting a seam ridge on the concave face of the work and a seam crease on the convex face of the work, of means for applying a tape to the concave face of the work over the seam ridge.

WALTER P. OSGOOD.